May 15, 1951 J. A. FRY 2,553,366

CRYSTAL CONTROLLED HIGH-FREQUENCY OSCILLATOR

Filed May 29, 1950

INVENTOR
John A. Fry
BY
Emery, Holcombe & Blair
ATTORNEY

Patented May 15, 1951 2,553,366

UNITED STATES PATENT OFFICE 2,553,366

CRYSTAL CONTROLLED HIGH-FREQUENCY OSCILLATOR

John A. Fry, Cambridge, England, assignor to Pye Limited, Cambridge, England, a British company Application May 29, 1950, Serial No. 164,961
In Great Britain June 15, 1949

11 Claims. (Cl. 250—36)

The present invention relates to crystal controlled high frequency oscillators incorporating a plurality of crystals which may be selectively connected in the oscillator circuit for determining the frequency of the electric oscillations produced. Hitherto such switching has been effected by a conventional selector switch which must of necessity be at the same location as the oscillator.

The present invention has for an object to provide a switching arrangement for selectively switching the crystals into the oscillator circuit which can be operated from a remote point. To this end, according to the invention, the crystals are each connected in the oscillator circuit through an individual rectifier, means being provided for selectively biassing the rectifiers either to their conducting or non-conducting state whereby the crystal to be connected in the oscillator circuit may be selected by the application of the appropriate bias to the corresponding rectifier. The application of the bias to the individual rectifiers may be easily effected from a remote point.

In one embodiment according to the invention, the oscillator is of the type in which two valves are used and the crystals are connected between their cathodes to provide feed back paths of low impedance at the series resonant frequency of the crystal. The crystals are permanently connected in the circuit in series with individual rectifiers, which may be of the thermionic or the barrier layer type. All the rectifiers may have one of their poles connected to the cathode of one of the valves of the oscillator, the other poles of the rectifiers being normally connected to a source of positive potential higher than cathode potential. The rectifiers are orientated so that normally they do not conduct by reason of the more positive potentials applied to their poles remote from the cathode. Switching means are provided, which may conveniently be located at a remote point for selectively reducing the potential applied to the rectifiers whereby the rectifiers are selectively rendered conducting and thus connect the corresponding crystal in the oscillator circuit.

In a preferred form the positive bias for the rectifiers is derived from the high tension supply for the oscillator through one or more resistances connected to a point intermediate a rectifier and its associated crystal. Each of these points is also connected to a contact of a selector switch whereby they may be selectively connected to earth or some other point of low potential. When one of these points is connected to earth the biassing potential on the corresponding rectifier is changed, by reason of the voltage drop through the resistances, and causes the rectifier to conduct and connect the associated crystal in the oscillator circuit.

In order that the invention may be clearly understood, reference will now be made to the accompanying drawings in which a preferred embodiment of the invention is shown diagrammatically and by way of example.

Figure 1:
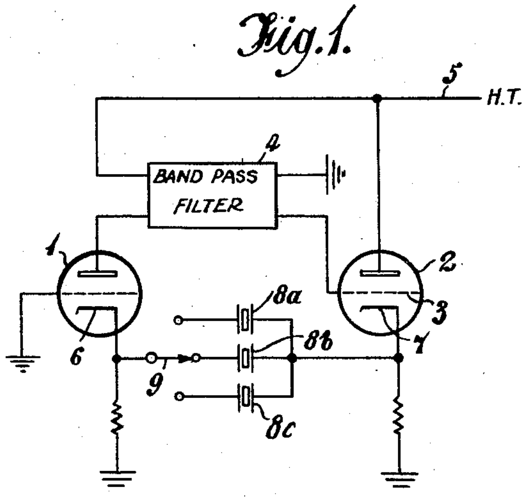
Fig. 1 is a circuit diagram of a known crystal controlled oscillator.

Referring to Fig. 1 of the drawings, this shows a known form of oscillator comprising two triodes 1 and 2, the output from valve 1 being applied to the grid 3 of valve 2 through any convenient known form of band pass filter 4. The positive lead from a source of supply of high tension current is indicated at 5. The cathodes 6 and 7 of the two valves 1 and 2 are connected together through one of a plurality of crystals 8*a*, 8*b*, 8*c* by a selector switch 9. The crystals, which are of different resonant frequency, each provide a feed back path of low impedance at their series resonant frequency when connected in the circuit by means of the selector switch. The valves are thus caused to oscillate at a frequency determined by the crystal selected.

With such an arrangement, the selector switch 9 must of necessity be at the same location as the oscillator.

Figure 2:
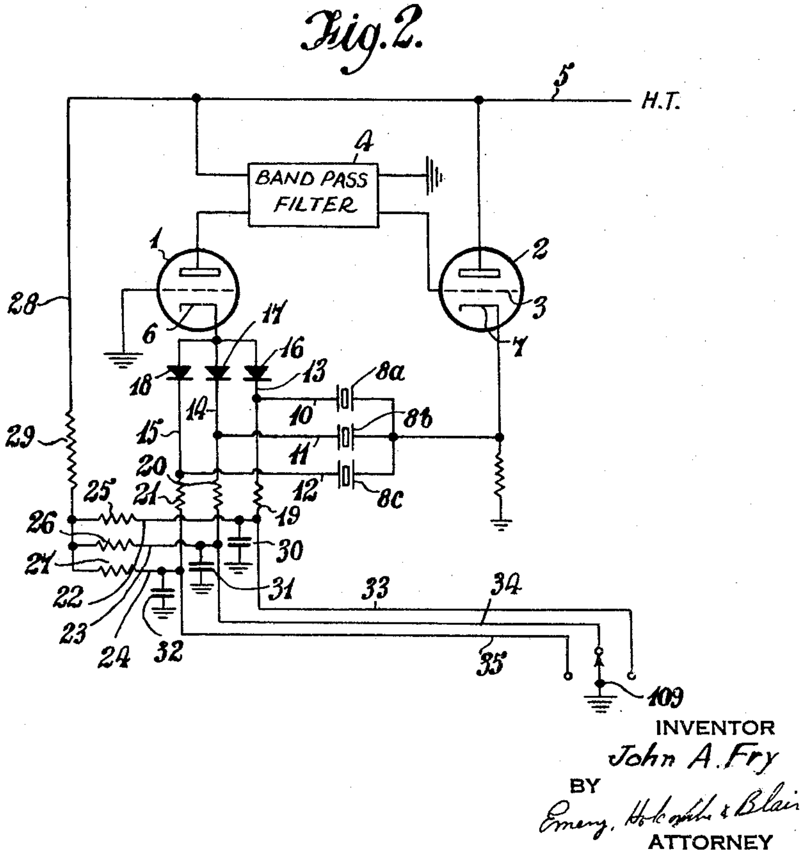
Fig. 2 is a circuit diagram of a crystal controlled oscillator according to the invention.

Referring now to Fig. 2 which shows an oscillator according to the invention with remotely controlled switching, valves 1 and 2 are coupled together in a basically similar manner to those of Fig. 1 and similar parts are given the same reference numerals. In this arrangement, however, the crystals 8*a*, 8*b*, 8*c* are permanently connected between the cathodes 6 and 7 of the two valves by means of parallel leads 10, 11, 12 connected to leads 13, 14, 15 respectively. Connected in the leads 13, 14, 15 are rectifiers 16, 17 and 18 respectively. These may be of any convenient type, such as diodes or barrier layer type, but germanium diodes have been found to give the most satisfactory results. The rectifier poles which are the more negative in the conducting state of the rectifiers, that is the cathodes in the case of diode rectifiers, are biassed to a positive potential such that the rectifiers are rendered non-conducting. To this end, leads 13, 14, 15 are connected through resistors 19, 20, 21 leads 22, 23, 24 and resistors 25, 26, 27 respectively to a common lead 28 connected to the positive high tension lead 5 and containing a common resistor 29. Earthing condensers 30, 31, 32 are connected to the leads 22, 23, 24 respectively. The last mentioned leads are also connected by leads 33, 34, 35 respectively to a remotely situated selector switch 109 analogous to the switch 9 of Fig. 1 for selectively rendering operative the crystals 8a, 8b, 8c by selectively connecting to earth, or to some other point of low potential, the positively biassed poles of the rectifiers 16, 17, 18.

Each position of the switch 109 completes the circuit between the cathode 6 of valve 1, and earth, through the corresponding rectifier 16, 17 or 18 and the corresponding crystal 8a, 8b, or 8c is thereby connected into circuit. The cathodes or equivalent poles of all the other rectifiers are biassed positively by the resistor network and as they have a high resistance when so biassed, the remaining crystals are isolated from the circuit.

The crystals 8a, 8b, 8c, may be of any convenient kind, for example quartz crystals and may operate at fundamental or overtone frequency. Preferably they are operated at or near fundamental frequency, higher frequencies being obtained by additional frequency multiplying stages in known manner.

Whilst a particular embodiment of the invention has been described, it will be understood that various modifications may be made without departing from the spirit of the invention.

I claim:

1. In a crystal controlled high frequency oscillator, a plurality of crystals each operable to control the frequency of said oscillator, a rectifier connected in series with each of said crystals, means for biassing each of said rectifiers to a non-conducting state and means for selectively reducing said bias.

2. In a crystal controlled high frequency oscillator, a plurality of crystals each operable to control the frequency of said oscillator, a rectifier connected in series with each of said crystals, means for biassing each of said rectifiers to a non-conducting state and remotely situated means for selectively reducing said bias.

3. In a crystal controlled high frequency oscillator, a plurality of crystals each operable to control the frequency of said oscillator, a rectifier in series with each of said crystals, means for positively biassing each of said rectifiers to a non-conducting state and means for selectively connecting said rectifiers to a point at a lower potential than said biassing potential.

4. In a crystal controlled high frequency oscillator, a plurality of crystals each operable to control the frequency of said oscillator, a rectifier in series with each of said crystals, means for positively biassing each of said rectifiers to a non-conducting state and a remotely situated selector switch for selectively connecting said rectifiers to a point at a lower potential than said biassing potential.

5. A crystal controlled high frequency oscillator comprising two thermionic valves, a plurality of electrical conducting paths between the cathodes of said valves, a rectifier and a crystal connected in series in each of said conducting paths, means for biassing each of said rectifiers to a non-conducting state, and means for selectively reducing said bias.

6. A crystal controlled high frequency oscillator comprising two thermionic valves, a plurality of electrical conducting paths between the cathodes of said valves, a rectifier and a crystal in series in each of said conducting paths, means for positively biassing each of said rectifiers to a non-conducting state, and a remotely situated selector switch for selectively connecting said rectifiers to a point at low potential.

7. In a crystal controlled high frequency oscillator, a plurality of crystals each operable to control the frequency of said oscillator, a diode in series with each of said crystals, means for positively biassing the cathode of each of said diodes to a non-conducting state and means for selectively connecting said cathodes to a point at a lower potential than said biassing potential.

8. A crystal controlled high frequency oscillator comprising two thermionic valves, a plurality of electrical conducting paths between the cathodes of said valves, a diode and a crystal connected in series in each of said conducting paths, means for positively biassing the cathode of each of said diodes to a non-conducting state, and a remotely situated selector switch for selectively connecting said diode cathodes to a point at low potential.

9. An oscillator as claimed in claim 8 wherein the diodes are germanium diodes.

10. An oscillator as claimed in claim 5 wherein the rectifiers are of the barrier layer type.

11. An oscillator as claimed in claim 5 wherein the oscillator operates at approximately the fundamental series resonant frequency of the crystals.

JOHN A. FRY.

No references cited.